United States Patent
Parnin

(10) Patent No.: US 9,494,048 B1
(45) Date of Patent: Nov. 15, 2016

(54) ACTIVE SYSTEM FOR BEARING OIL DAMPER SUPPLY AND VIBRATION CONTROL

(71) Applicant: United Technologies Corporation, Hartford, CT (US)

(72) Inventor: Francis Parnin, Suffield, CT (US)

(73) Assignee: United Technologies Corporation, Hartford, CT (US)

( * ) Notice: Subject to any disclaimer, the term of this patent is extended or adjusted under 35 U.S.C. 154(b) by 6 days.

(21) Appl. No.: 14/709,866

(22) Filed: May 12, 2015

(51) Int. Cl.
  F16C 27/00 (2006.01)
  F01D 25/16 (2006.01)
  F16C 19/52 (2006.01)
  F16C 19/06 (2006.01)
  F16C 35/04 (2006.01)
  F16C 39/04 (2006.01)

(52) U.S. Cl.
  CPC ............ F01D 25/164 (2013.01); F16C 19/06 (2013.01); F16C 19/527 (2013.01); F16C 35/042 (2013.01); F16C 39/04 (2013.01); F05D 2220/32 (2013.01); F05D 2240/54 (2013.01); F05D 2240/90 (2013.01); F05D 2260/96 (2013.01)

(58) Field of Classification Search
  CPC ................ F16C 27/045; F16C 27/02; F05D 2240/54; F05D 2260/96
  USPC ........... 384/99, 435, 581; 415/110, 111, 113, 415/119
  See application file for complete search history.

(56) References Cited

U.S. PATENT DOCUMENTS

| 3,026,859 | A |   | 3/1962 | Barnett et al. |
| 4,947,639 | A | * | 8/1990 | Hibner ............ F01D 25/164 384/535 |
| 5,071,262 | A | * | 12/1991 | Monzel ............ F01D 25/164 384/581 |
| 7,431,504 | B1 | * | 10/2008 | Pelfrey ............ F01D 25/164 384/535 |
| 9,046,001 | B2 |   | 6/2015 | Hindle et al. |
| 2002/0136473 | A1 |   | 9/2002 | Mollmann |

FOREIGN PATENT DOCUMENTS

GB 2111136 A * 6/1983 ............. F16C 19/52

* cited by examiner

Primary Examiner — Phillip A Johnson
(74) Attorney, Agent, or Firm — Kinney & Lange, P.A.

(57) ABSTRACT

A bearing damping system includes a pump configured to pump a fluid. The system further includes a variable position valve having a plurality of open positions each configured to generate different pressures in the fluid downstream from the variable position valve. The system also includes a bearing assembly. The bearing assembly includes a bearing housing. The bearing assembly also includes a stationary bearing race positioned within the bearing housing. The bearing assembly also includes a rotating bearing race spaced apart from the stationary bearing race and configured to be attached to a rotating component. A bearing element is disposed between the stationary bearing race and the bearing housing. A fluid compartment is defined by the space between the bearing housing and the stationary race and is configured to receive the fluid from the second conduit.

20 Claims, 10 Drawing Sheets

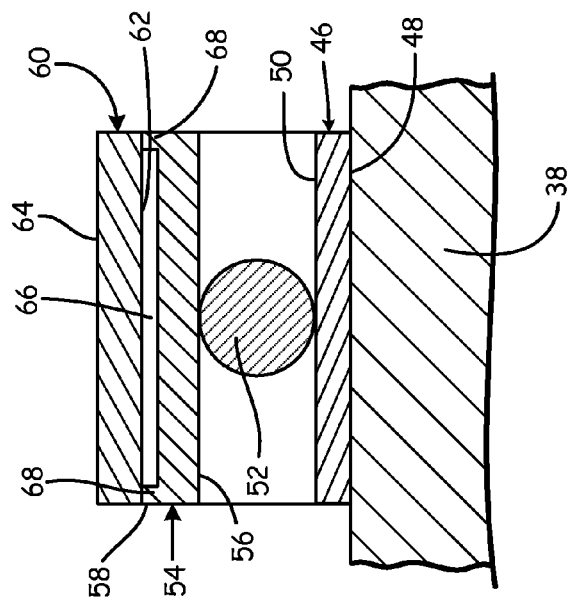
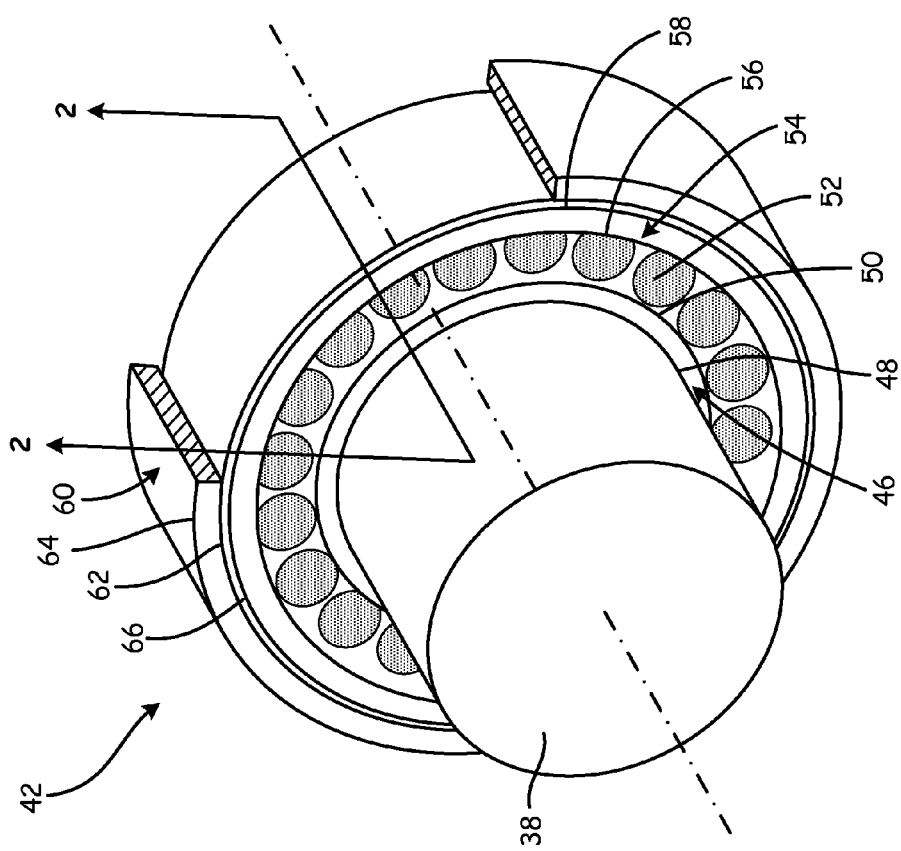
Fig. 3
Fig. 2

ACTIVE SYSTEM FOR BEARING OIL DAMPER SUPPLY AND VIBRATION CONTROL

BACKGROUND

Gas turbine engines can include fluid damped bearings to help maintain vibration and displacement of rotating components within acceptable limits. Typically, these fluid damped bearings are fed oil from the engine oil system and accept the oil at a pressure generated by the system. Typical systems regulate fluid flow to the fluid damped bearing with a valve that switches between on and off positions. In some cases, however, alternating between on and off positions exclusively can cause the oil flow rate to stray from an optimal flow rate to a rate that is either too high or too low. Either condition can lead to undesired vibration and displacement of rotating components during operation of the gas turbine engine. There is, accordingly, a need for a fluid damped bearing system that can help maintain an optimum flow of fluid to the fluid damped bearing during operation of the gas turbine engine.

SUMMARY

According to one embodiment of this disclosure a bearing damping system includes a pump configured to pump a fluid through the system. The system further includes a variable position valve connected to the pump by a first conduit and having a plurality of open positions each configured to generate a different flow in the fluid downstream from the variable position valve. The system also includes a bearing assembly connected to the variable position valve by a second conduit. The bearing assembly includes a bearing housing having an outer surface and an inner surface. The bearing housing is configured to be attached to a stationary structure. The bearing assembly also includes a stationary bearing race having an outer surface and an inner surface and is positioned within the bearing housing. The bearing assembly also includes a rotating bearing race having an outer surface and an inner surface spaced apart from the stationary bearing race and configured to be attached to a rotating component. A bearing element is disposed between the inner surface of the stationary bearing race and the outer surface of the rotating race. A fluid compartment is defined by the space between the inner surface of the bearing housing and the outer surface of the stationary race and is configured to receive the fluid from the second conduit.

According to another embodiment of this disclosure a gas turbine engine includes a stationary section and a rotating section joined to a shaft. The gas turbine engine also includes a bearing housing having a radially outer surface and a radially inner surface. The bearing housing is attached to the stationary section of the gas turbine engine. A stationary bearing race having a radially outer surface and a radially inner surface is spaced radially inward from the bearing housing. A rotating bearing race having a radially outer surface and a radially inner surface is spaced radially inward from the stationary bearing race and attached to the shaft. A bearing element is disposed between the radially inner surface of the stationary bearing race and the radially outer surface of the rotating bearing race. A fluid compartment is defined by the space between the radially inner surface of the bearing housing and the radially outer surface of the stationary race. The gas turbine engine also includes a pump configured to pump a fluid into the fluid compartment. The gas turbine engine further includes a variable position valve disposed between the fluid compartment and the pump. The variable position valve has a plurality of open positions configured to generate a plurality of fluid flows within the fluid compartment.

According to yet another embodiment of the disclosure a method of adjusting a stiffness of a fluid damped bearing includes the step of pumping a fluid through a variable position valve having a plurality of open positions. The method further includes the step of sensing a parameter relating to a vibration rate of a rotating component. The method also includes the step of actuating a variable position valve in response to the sensed parameter to control a flow of a fluid. The method additionally includes the step of routing the fluid from the variable positon valve to a fluid compartment formed between a bearing housing and a stationary race of the fluid damped bearing.

BRIEF DESCRIPTION OF THE DRAWINGS

FIG. 2 is a perspective sectional view of a ball bearing including a fluid damper compartment.

FIG. 3 is a sectional view of the ball bearing taken along line 2-2 from FIG. 2.

DETAILED DESCRIPTION

This disclosure is directed towards fluid damped bearings. More particularly, this disclosure is directed towards regulating the fluid pressure in fluid damped bearings.

Figure 1:
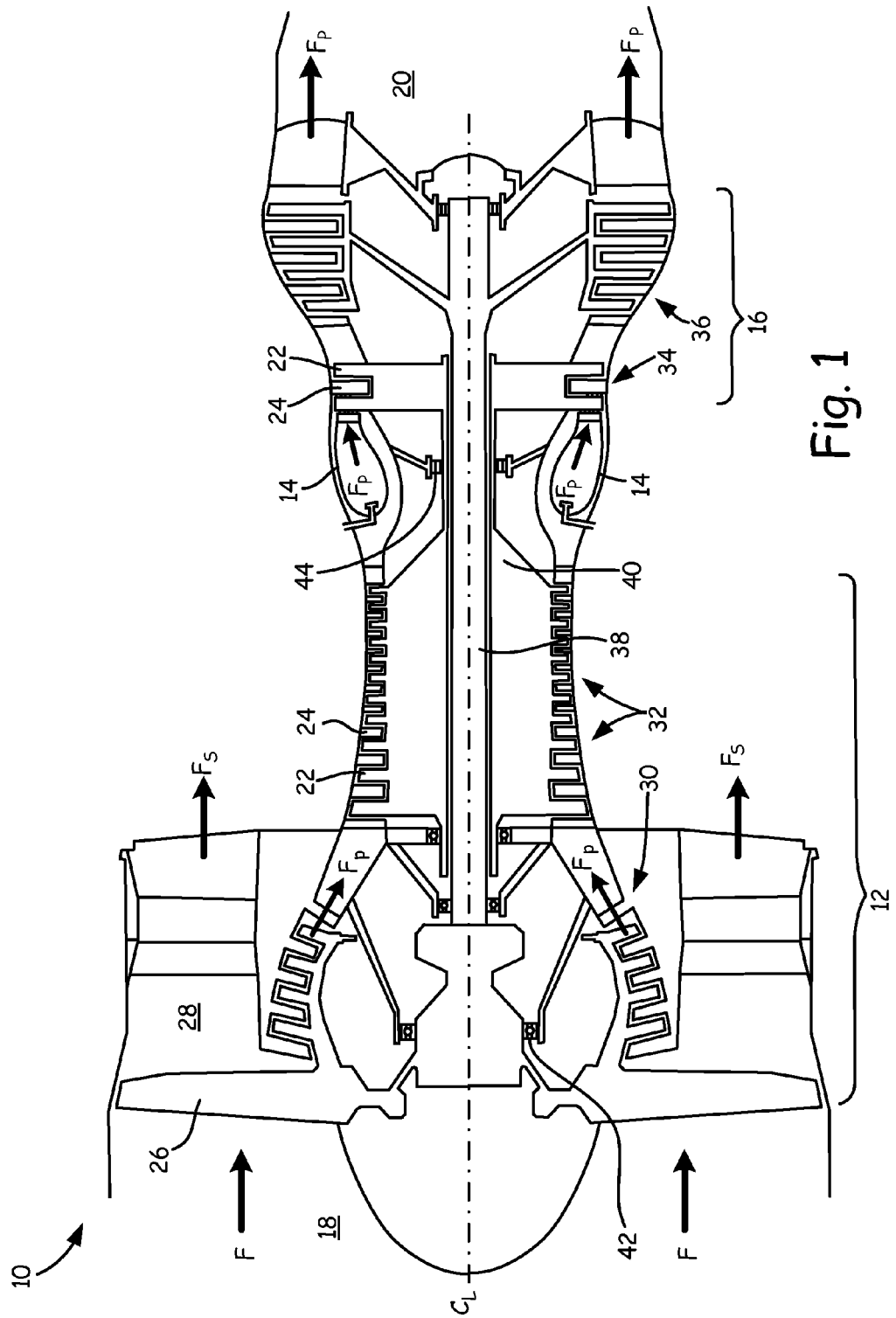
FIG. 1 is a sectional view of a gas turbine engine.

FIG. 1 is a sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also be provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

Gas turbine engine 10 can also include geared architecture such as a fan drive gear system.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Primary flow $F_P$ is compressed in low pressure compressor 30 and high pressure compressor 32, and then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. Each shaft is associated with at least one bearing such as damped ball bearing 42 or damped roller bearing 44.

Turbine efficiency and performance depends on the overall pressure ratio, defined by the total pressure at inlet 18 as compared to the exit pressure of compressor section 12, for example at the outlet of high pressure compressor 32, entering combustor 14.

FIG. 2 is a perspective sectional view of damped ball bearing 42. Although FIG. 2 shows damped ball bearing 42, the concepts described below are equally applicable to damped roller bearing 44. FIG. 2 includes rotating race 46, which includes rotating race radially inner surface 48 and rotating race radially outer surface 50; bearing element 52; stationary race 54, which includes stationary race radially inner surface 56 and stationary race radially outer surface 58; bearing housing 60, which includes bearing housing radially inner surface 62 and bearing housing radially outer surface 64; and fluid compartment 66.

Low pressure shaft 38 defines a central rotational axis of gas turbine engine 10. As stated above, low pressure shaft 38 drives rotation of propulsion fan 26, low pressure compressor 30, and low pressure turbine 36 which define the LP spool. Although low pressure shaft 38 is depicted in FIG. 2, this description can also apply to high pressure shaft 40 which drives rotation of high pressure compressor 32 and high pressure turbine 34 which define the HP spool. Damped ball bearing 42 surrounds low pressure shaft 38. Damped ball bearing 42 helps to facilitate rotation of low pressure shaft 38.

Rotating race 46 of damped ball bearing 42 is annularly shaped and circumscribes low pressure shaft 38. Rotating race 46 includes rotating race radially inner surface 48 and rotating race radially outer surface 50. Low pressure shaft 38 is joined to rotating race inner surface 48. Rotating race radially outer surface 50 interfaces with bearing element 52. As depicted in FIG. 2, bearing element 52 is a ball but in other embodiments bearing element 52 can be a cylindrical roller or a tapered roller bearing.

Stationary race 54 of damped ball bearing 42 circumscribes and is spaced apart from rotating race 46. Stationary race 54 includes radially inner surface 56 and radially outer surface 58. Stationary race radially inner surface 56 is spaced apart from rotating race radially outer surface 50 and bearing element 52 is disposed therebetween.

Bearing housing 60, of damped ball bearing 42, circumscribes stationary race 54 and includes bearing housing radially inner surface 62 and bearing housing radially outer surface 64. Bearing housing radially inner surface 62 is joined to stationary race radially outer surface 58. A space is formed between bearing housing radially inner surface 62 and stationary race radially outer surface 58 which defines fluid compartment 66. Bearing housing radially outer surface 64 is joined to a non-rotating stationary structure of gas turbine engine 10.

FIG. 3 is a sectional view of damped ball bearing 42 taken along line 2-2 from FIG. 2. FIG. 3 additionally illustrates radial extensions 68. Radial extensions 68 extend from the axial ends of stationary race radially outer surface 58. Radial extensions 68 are joined to bearing housing radially inner surface 62 and seal fluid compartment 66. In other embodiments of damped ball bearing 42 radial extensions 68 can be replaced with piston rings or O-rings.

In operation, low pressure shaft 38 rotates as core air flow flows through gas turbine engine 10. Rotating race 46 rotates along with low pressure shaft 38. The rotation is facilitated by bearing elements 52. Bearing elements 52 also help to keep low pressure shaft 38 in a proper position because they are sized to fit between rotating race 46 and stationary race 54 so as to maintain contact with both races 46 and 54.

As low pressure shaft 38 rotates, it can vibrate and impart relatively strong forces radially outward from the central axis of gas turbine engine 10. These forces are transmitted radially outward to rotating race 46. The forces are then transmitted radially outward to bearing elements 52. From bearing elements 52, the forces are transmitted radially outward to stationary race 54.

Fluid compartment 66 is filled with a fluid such as engine oil. The fluid is typically pressurized and has a low viscosity. As an example, engine oil can be supplied to fluid compartment 66 at a temperature ranging from approximately 93.3 degrees Celsius (200 degrees Fahrenheit) to approximately 140.5 degrees Celsius (285 degrees Fahrenheit). At these temperatures the viscosity of the oil can range from approximately 5.8 centistokes to approximately 2.8 centistokes. Fluid 74 in fluid compartment 66 acts to dampen the vibrational forces described above. The damping effect is generated, in part, by the fluid in fluid compartment 66 being squeezed from one location in compartment 66 to another as stationary race 54 translates towards bearing housing 60 due to the vibration of low pressure shaft 38. As a result of the damping effect provided by the fluid, the severity of the vibrational forces projecting radially outward to bearing housing 60 are lessened. As a result, a less severe vibrational force is translated radially outward from bearing housing 60 to other structures in gas turbine engine 10 and the degree to which low pressure shaft 38 vibrates is also lessened.

The degree to which fluid in fluid compartment 66 dampens vibrations is a function of many factors. One factor is the amount of fluid 74 in fluid compartment 66. The degree to which fluid compartment 66 is filled with fluid 74 can be referred to as the fill volume of fluid compartment 66. The amount of fluid 74 in fluid compartment 66 is a function of the rate of flow of fluid 74 into compartment 66 as compared to the rate of flow of fluid 74 out of compartment 66. The flow rate of fluid 74 into fluid compartment 66 is largely driven by the pressure of fluid 74 supplied to fluid compartment 66. This pressure can be referred to as a feed pressure.

If the feed pressure is too low, then the amount of fluid 74 in fluid compartment 66 will not be able to sufficiently absorb the vibrational forces that are transmitted to it. These conditions give rise to a soft damper. If, on the other hand, the feed pressure of fluid 74 is too high, then the fluid compartment 66 will be over full and vibrational forces will be able to easily translate through the fluid to bearing housing 60. These conditions give rise to a stiff damper. A fluid feed pressure should be maintained to keep fluid compart 66 at an optimum fill volume that is between the soft and stiff damper conditions.

Fluid viscosity is another factor that is relevant to the fluid's ability to dampen vibrations. The more viscous the fluid is the less likely it is to be displaced too easily by vibrational forces. If the fluid's viscosity is too high however, such that fluid 74 does not move around in fluid compartment 66, then the vibrational forces will translate through it. Fluid viscosity can also be reduced during operation of low pressure shaft 38 if the fluid supply temperature is elevated.

Figure 4:
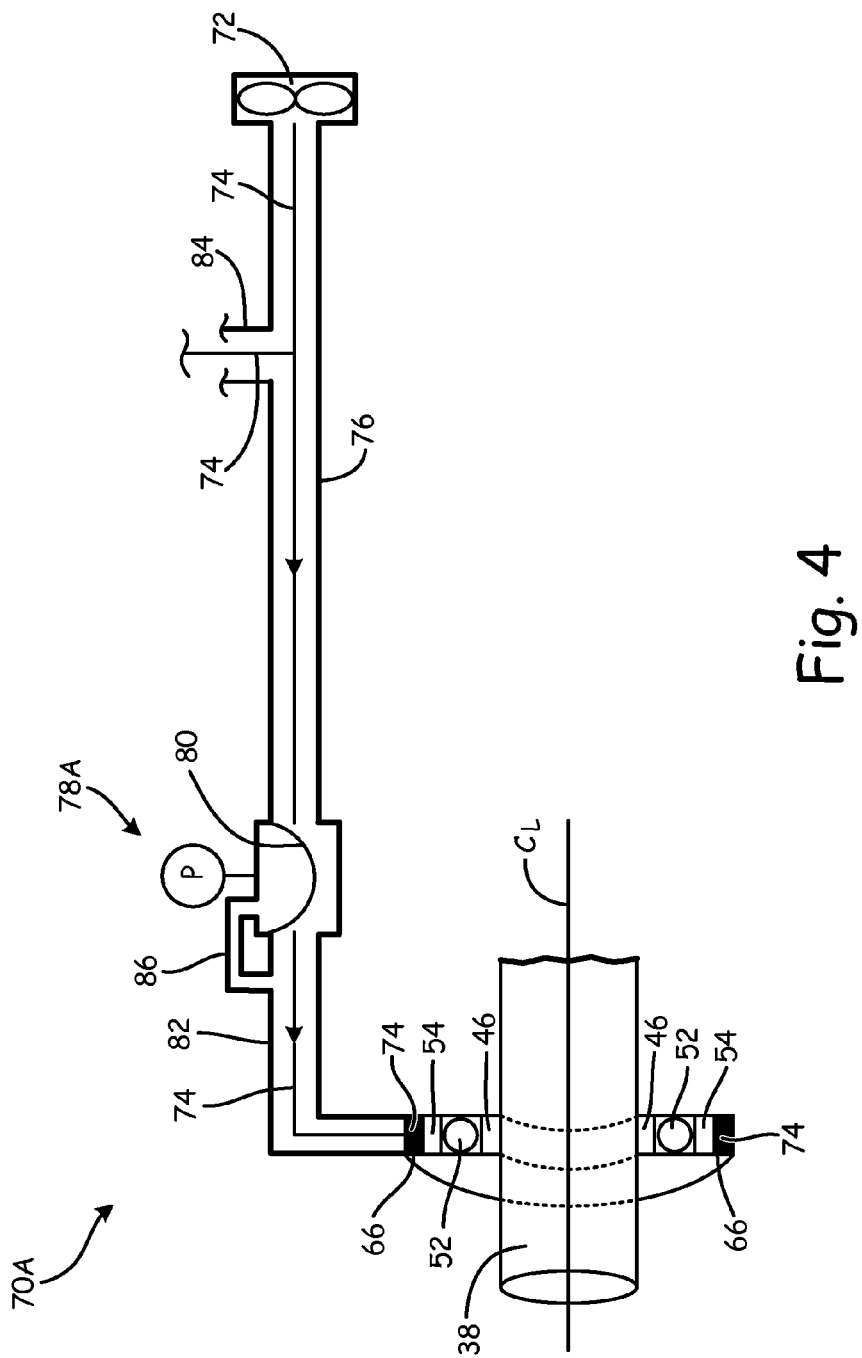
FIG. 4 is a schematic view of a bearing damping system with a pressure regulating valve regulating fluid flow.

FIG. 4 is a schematic view of bearing damping system 70A. FIG. 4 shows shaft 38, pump 72, fluid 74, first conduit 76, variable position valve 78A, diaphragm 80, second conduit 82, third conduit 84, and sensing line 86.

Pump 72 contains fluid 74 and is connected to first conduit 76. First conduit 76 leads away from pump 72 and connects to variable position valve 78A. Variable position valve 78A includes diaphragm 80. Second conduit 82 leads away from variable position valve 78A, passes through bearing housing 60, and terminates in fluid compartment 66. Third conduit 84 branches from first conduit 76 and leads to a component of gas turbine engine 10. Sensing line 86 is connected on one end to second conduit 82 and to the backside of diaphragm 80 on another end.

In operation, fluid 74 is pumped through first conduit 76 by pump 72. Pump 72 produces a continuous flow of fluid 74 through bearing damping system 70A. The pressure of fluid 74 in first conduit 76 can depend on the diameter of first conduit 76, flow rate of fluid 74, viscosity of fluid 74, and the temperature of fluid 74. Fluid 74 can flow into third conduit 84 which takes fluid 74 to other components of gas turbine engine 10 that require fluid 74 (e.g., for lubrication purposes). Fluid 74 that does not enter third conduit 84 enters variable position valve 78A.

Variable position valve 78A is disposed between first conduit 76 and second conduit 82. Variable position valve 78A has a plurality of open positions. Each open position either contracts or expands a flow area in variable position valve 78A for fluid 74 to pass through in order to enter second conduit 82. The flow of fluid 74 through variable position valve 78A is reduced when fluid 74 passes through a flow area having a smaller diameter than first conduit 76. Thus the flow of fluid 74 in second conduit 82 can be controlled by alternating variable position valve 78A between the plurality of open positions.

Variable position valve 78A as shown in FIG. 4 is a pressure sensing valve that includes diaphragm 80, which regulates flow through valve 78A. Diaphragm 80 is pressure actuated. That is, if a pressure on the back side of diaphragm 80 exceeds a threshold value, then diaphragm 80 is actuated to constrict the flow area of variable position valve 78A through which fluid 74 can pass. If, on the other hand, the pressure on the back side of diaphragm 80 is less than a threshold value, then diaphragm 80 is actuated to expand the flow area that fluid 74 can pass through in variable position valve 78A. In other embodiments of variable position valve 78A diaphragm 80 can be replaced with a poppet.

Communication of the fluid pressure to the back side of diaphragm 80 is facilitated by sensing line 86. Sensing line 86 can be connected to second conduit 82 or fluid compartment 66 on one end and is connected to the back side of diaphragm 80 on the other end. The fluid pressure in either second conduit 82 or fluid compartment 66 will then be communicated to diaphragm 80 which is actuated as described above to increase or decrease the flow area in variable position valve 78A for fluid 74 to flow through.

After passing through variable position valve 78A, fluid 74 enters second conduit 82. Fluid 74 flows through second conduit 82 into fluid compartment 66. As stated above, variable position valve 78A controls the flow of fluid 74 that is fed into second conduit 82 and fluid compartment 66. In controlling the flow of fluid 74 variable position valve 78A can also control the pressure of fluid 74 downstream from valve 78A. For example the flow of fluid 74 can be increased so as to increase the pressure of fluid 74 fed into fluid compartment 66.

The flow of fluid 74 can also be decreased in order to decrease the volume of fluid 74 within fluid compartment 66. By decreasing the flow of fluid 74 into fluid compartment 66 the fluid volume inside compartment 66 will decrease because fluid 74 exits fluid compartment 66 during operation of gas turbine engine 10. Thus, if the flow of fluid 74 is restricted, then incoming fluid will not replace fluid that exited fluid compartment 66 at a fast enough rate to maintain the fill volume of fluid compartment 66.

Figure 5A:
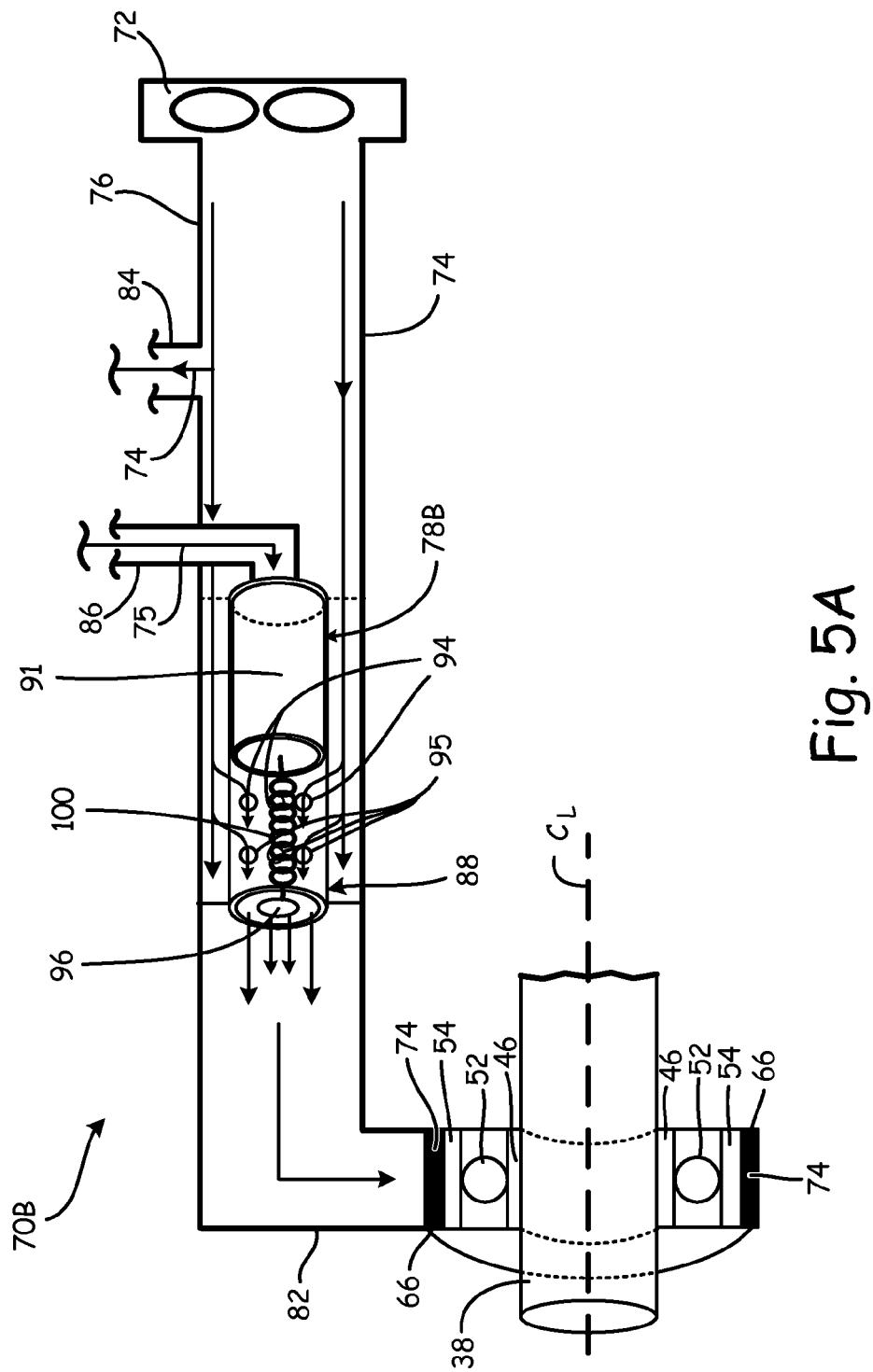
FIG. 5A is a schematic view of a bearing damping system with a variable position valve regulating fluid flow in a first open position.

FIG. 5A is a schematic view of bearing damping system 70B including variable position valve 78B. Variable position valve 78B includes multiple orifice sleeve 88 having first plurality of orifices 94, second plurality of orifices 95, and outlet 96. Poppet 91 and spring 100 are also shown. Combustor bleed gas 75 is also shown.

Sleeve 88 is fastened within first conduit 76. As stated above sleeve 88 includes first and second pluralities of orifices 94 and 95. As shown, each plurality of orifices is formed from a group of three orifices. In other embodiments each plurality of orifices 94 and 95 can include other plural numbers of orifices. Outlet 96 is formed in an end of sleeve 88 near second conduit 82. Poppet 91 is solid and is disposed within sleeve 88. Spring 100 is attached to sleeve 88 near outlet 96 and to poppet 91. Sensing line 86 runs from second conduit 82 to the backside of poppet 91.

In operation, fluid 74 passes through bearing damping system 70B in much the same way as in bearing damping system 70A. One difference between the two systems is that the feed pressure of fluid 74 is controlled by variable positon valve 78B in bearing damping system 70B. In the embodiment shown in FIG. 5, variable position valve 78B has two open positions and one closed position. Variable position valve 78B is fully open in the first open position. This is shown in FIG. 5A as poppet 91 is not blocking any of first or second plurality of orifices 94 or 95. Thus, the flow area through sleeve 88 is at a maximum.

Figure 5B:
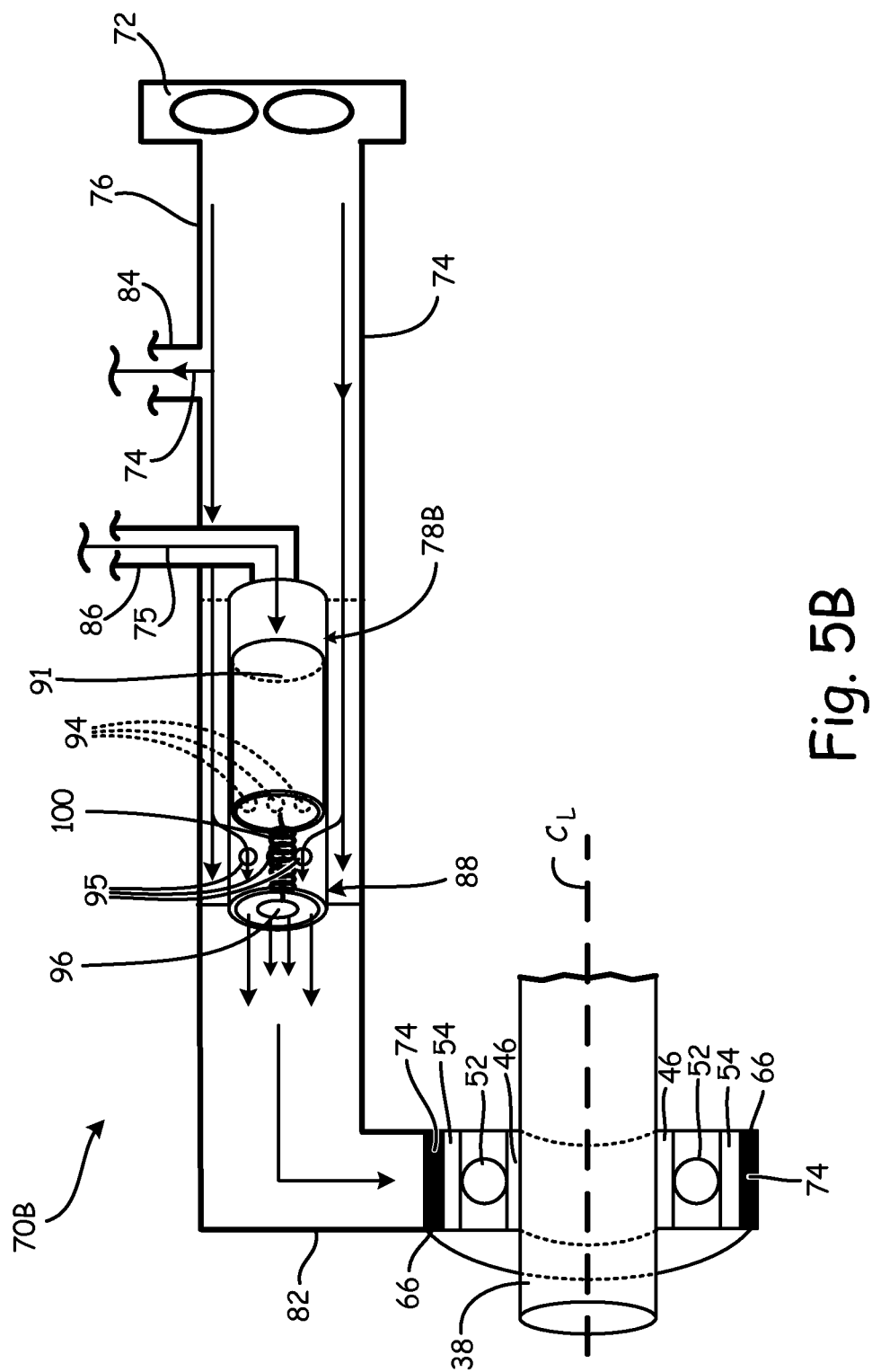
FIG. 5B is a schematic view of a bearing damping system with the variable position valve of FIG. 5A in a second open position.

FIG. 5B shows variable position valve 78B in the second open position. As shown, in the second open positon poppet 91 blocks first plurality of orifices 94. As a result, the feed pressure and flow of fluid 74 will be less than the pressure and flow of fluid 74 in first conduit 76. This is because the flow area through sleeve 88 is decreased. If variable position valve 78B is in the closed position, then second plurality of orifices 95 will be blocked by poppet 91. As can be understood from the above discussion, the feed pressure and flow of fluid 74 inside fluid compartment 66 can be controlled by adjusting the position of poppet 91 with respect to first and second plurality of orifices 94 and 95.

In other embodiments of variable position valve 78B additional pluralities of orifices can be included on sleeve 88 in order to increase the number of possible open positions in variable position valve 78B. Additionally, the orifices forming first and second pluralities of orifices 94 and 95 can be of uniform or differing sizes. In still further embodiments, orifices can be replaced with one or more elongated openings in sleeve 88. In that case, poppet 91 can be actuated along the openings to continuously increase or decrease the flow area through sleeve 88.

Variable position valve 78B can be actuated in many different ways such as in response to an operating condition of gas turbine engine 10. For example, actuation of variable position valve 78B can be driven in response to a sensed pressure of combustor bleed gas 75 in combustor 14. A pressure increase in combustor 14 can lead to a higher rate of rotation in low pressure turbine 36 which will cause low pressure shaft 38 to rotate faster and potentially cause increased vibrations.

An increase in pressure of combustor bleed gas 75 can be communicated to poppet 91 through sensing line 86, which is connected to combustor 14 and the backside of poppet 91. The pressure of combustor bleed gas 75 can cause poppet 91 to decrease the flow area through sleeve 88 by blocking the orifices in sleeve 88. As poppet 91 is actuated to block the orifices, spring 100 is compressed. If the pressure of combustor bleed gas 75 decreases, then spring 100 will expand and cause poppet 91 to be actuated to increase flow area through sleeve 88 by blocking fewer orifices.

Based on the correlation of the pressure sensed in combustor 14 and the rotation of low pressure shaft 38, variable position valve 78B can be configured to be actuated in order to adjust the feed pressure into fluid compartment 66 to maintain optimal feed pressure and fill volume in fluid compartment 66.

In addition to spring 100 actuating poppet 91 of variable position valve 78B, poppet 91 can be actuated by a threaded screw and bolt or by a magnet that is configured to generate a sufficient magnetic force to actuate poppet 91.

Figure 6A:
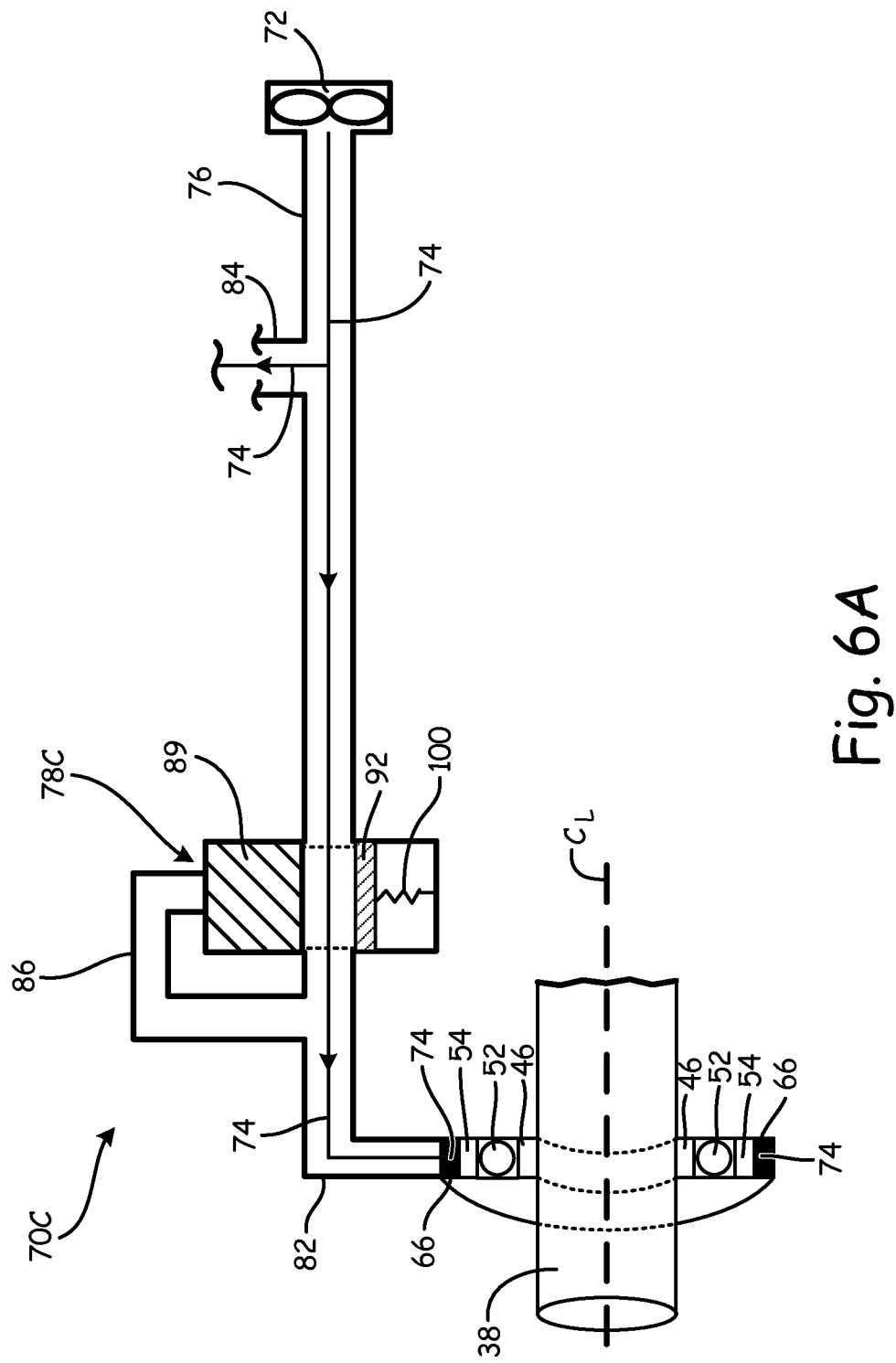
FIG. 6A is a schematic view of a bearing damping system with an alternative variable position valve regulating fluid flow in a first open position.

FIG. 6A is a schematic view of bearing damping system 70C. Bearing damping system 70C includes many of the same features as bearing damping system 70B. One difference is variable position valve 78C, which includes plate 89. Plate 89 is a solid plate. Bearing damping system 70C also includes piston 92 plate, which is connected to plate 89. Piston 92 plate is also connected to spring 100.

In operation, variable position valve 78C can be actuated to one of a plurality of positions ranging from a fully open position as illustrated in FIG. 6A to a fully closed position where plate 89 blocks flow of fluid 74 through variable position valve 78C. Thus, actuating plate 89 decreases or increases the flow area through variable position valve 78C, which determines the feed pressure of fluid 74 into fluid chamber 66. Plate 89 can be actuated as described above with respect to poppet 91. As shown in FIG. 6A sensing line 86 communicates fluid pressure in second conduit 82 to the backside of plate 89. As the pressure increases, plate 89 and piston plate 92 are actuated down. This causes plate 89 to be disposed between first conduit 76 and second conduit 82. As the pressure in second conduit 82 increase, spring 100 is compressed. If the pressure communicated by sensing line 86 decreases, then spring 100 will not remain compressed and piston plate 92 as well as plate 89 will be actuated up so as to increase the flow area through variable position valve 78C. Variable position valve 78C can, additionally, be actuated in a manner similar to that described above with respect to variable position valve 78B. For example, plate 89 can be actuated in response to a sensed pressure in combustor 14 as described above with respect to bearing damping system 70B.

Figure 6B:
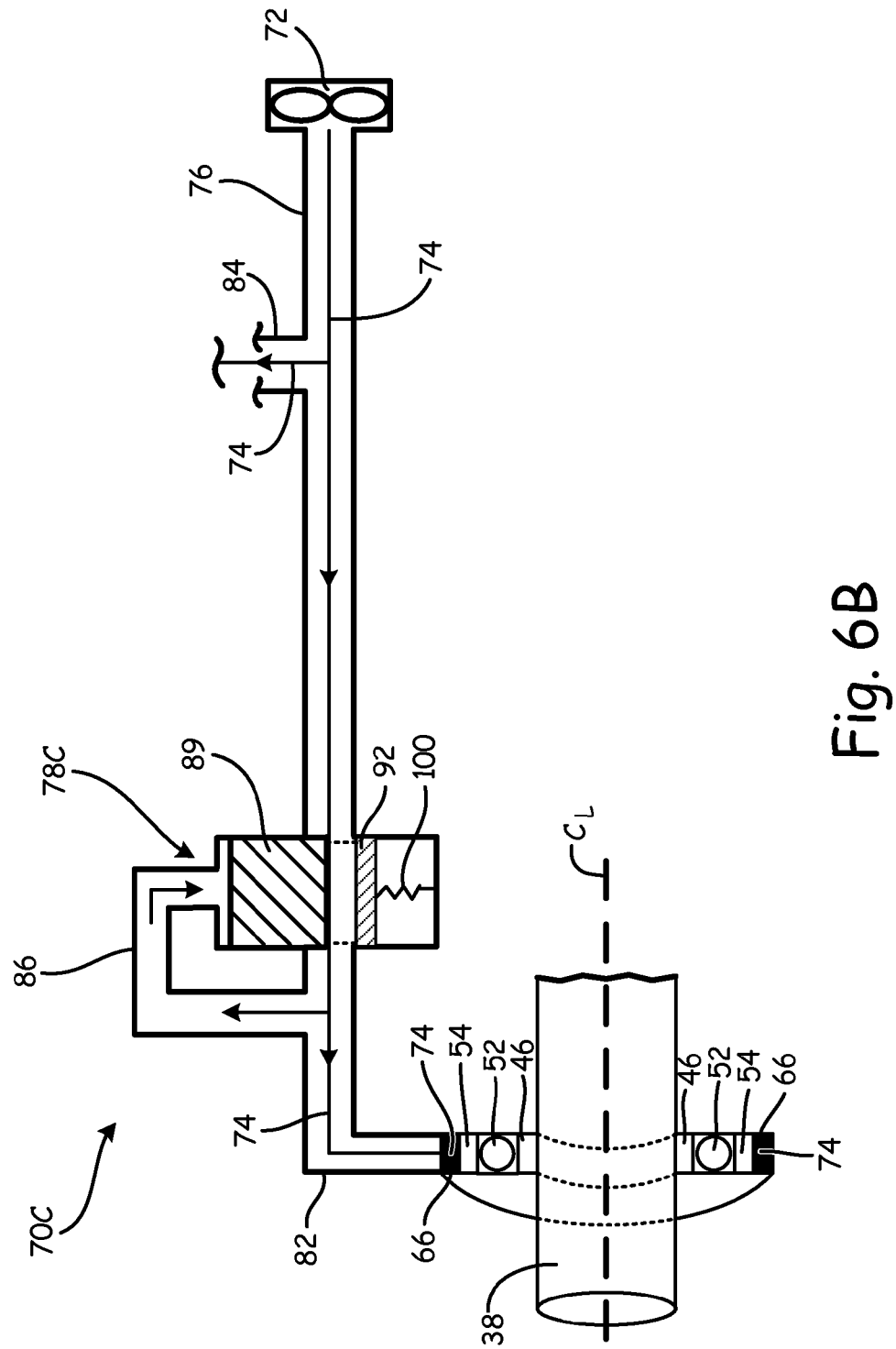
FIG. 6B is a schematic view of a bearing damping system with the variable position valve of FIG. 6A in a second open position.

FIG. 6B is a schematic view of bearing damping system 70C. FIG. 6B shows all of the same components as FIG. 6A. As shown, a portion of plate 89 is disposed between first conduit 76 and second conduit 82. Thus, the flow area through variable position valve 70C is decreased compared to the flow area though valve 70C shown in FIG. 6A.

Figure 7:
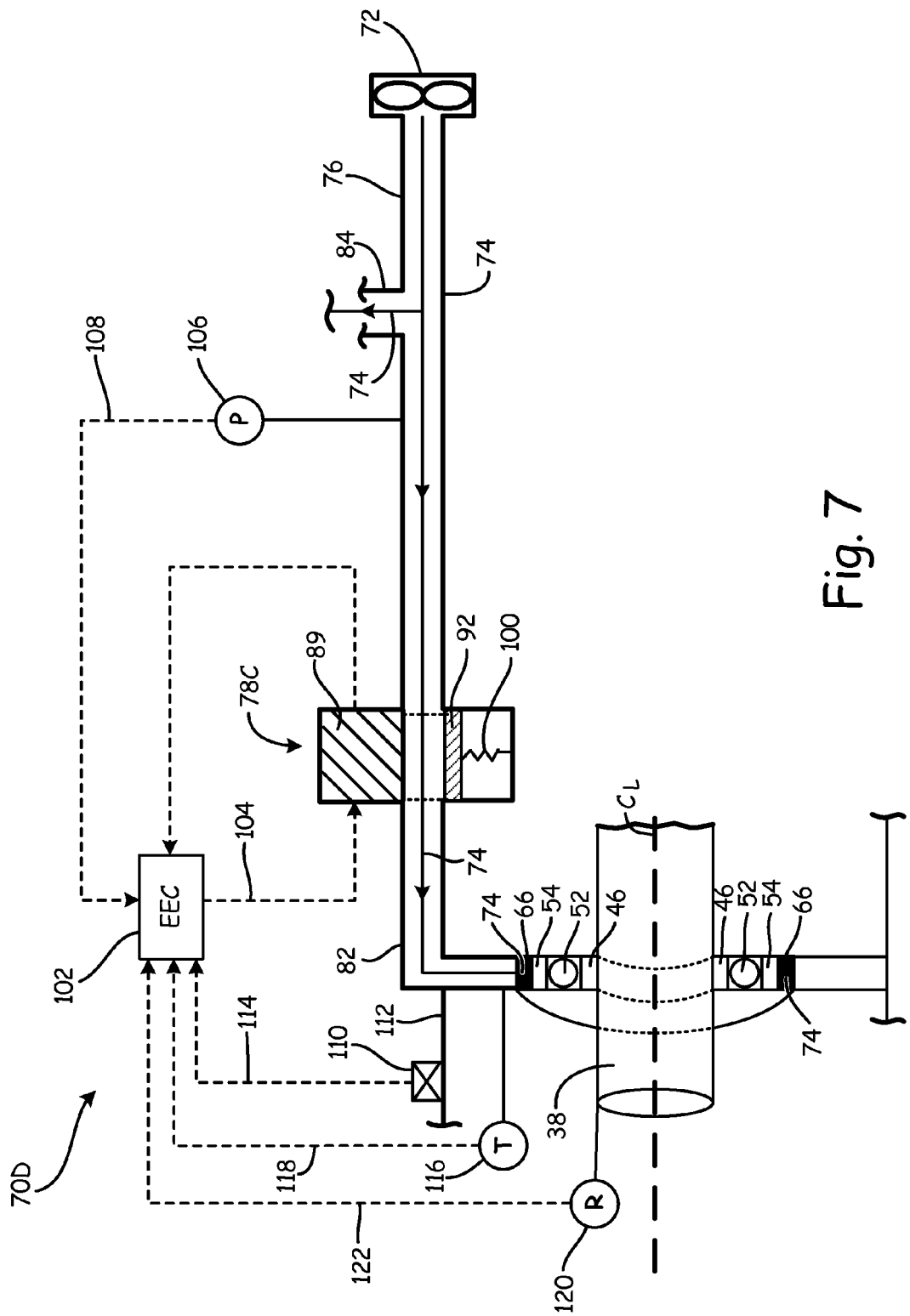
FIG. 7 is a schematic view of a bearing damping system with an electronically controlled variable position valve.

FIG. 7 is a schematic view of bearing damping system 70D. Bearing damping system 70D includes electronic engine controller 102, position channel 104, pressure sensor 106, pressure feedback channel 108, vibration sensor 110, stationary structure 112, vibration data channel 114, temperature sensor 116, temperature data channel 118, rotation sensor 120, and rotation data channel 122.

Plate 89 is disposed within variable position valve 78C as described above with respect to FIGS. 6A and 6B. Electronic engine controller 102 is disposed within gas turbine engine 10 and is configured to receive and transmit data within bearing damping system 70D. Electronic engine controller 102 includes position channel 104, which communicates position commands to variable position valve 78C and receives feedback on the position of plate 89. Pressure sensor 106 is disposed upstream of variable position valve 78C and senses the pressure of fluid 74. The pressure data sensed by pressure sensor 106 is communicated to electronic engine controller 102 by pressure feedback channel 108. Vibration sensor 110 is mounted to stationary structure 112 and transmits vibration data to electronic engine controller 102 by vibration data channel 114. Temperature sensor 116 is disposed near fluid compartment 66 and communicates temperature data to electronic engine controller 102 by temperature data channel 118. Rotation sensor 120 is positioned near low pressure shaft 38 and communicates rotational data to electronic engine controller 102 by rotation data channel 122.

In operation, plate 89 is actuated in response to a command generated by electronic engine controller 102. Plate 89 can be actuated in a manner similar to that described above with respect to FIGS. 6A and 6B. Electronic engine controller 102 can also be used to actuate diaphragm 80 of bearing damping system 70A or poppet 91 of bearing damping system 70B described above.

Electronic engine controller 102 can be programmed to interpret vibration related parameters and send a command to actuate variable positon valve 78A, 78B, or 78C into any of the open positions. Electronic engine controller 102 can also actuate variable position valve 78A, 78B, or 78C into a closed position. Electronic engine controller 102 can sense any one vibration related parameter individually or any combination of vibration related parameters discussed above simultaneously and issue an actuation command accordingly.

Pressure sensor 106 can transmit pressure data of fluid 74 in first conduit 76 to electronic engine controller 102 by pressure feedback channel 104. Electronic engine controller 102 can compare that data to a programmed schedule and send a position command to variable positon valve 78C by position channel 104. The position command will cause variable positon valve 78C to be actuated so as to produce an optimal feed pressure in second conduit 82 or fluid compartment 66. Position channel 104 can also communicate position feedback data to electronic engine controller 102 so that controller 102 will know what position variable position valve 78C is in.

Pressure sensor 106 can also be disposed to be able to sense the pressure of fluid 74 in second conduit 82 or fluid compartment 66. If electronic engine controller 102 determines that the pressure at either location is too low, then electronic engine controller 102 can send a command to open variable position valve 78A, 78B, or 78C to a greater degree by contracting diaphragm 80, positioning poppet 91 to increase the flow area through sleeve 88, or retracting plate 89 to increase the flow area through valve 78C. Alternatively, if the pressure is too high, then electronic engine controller 102 can send a command to close variable position valve 78A, 78B, or 78C to a greater degree by expanding diaphragm 80, positioning poppet 91 to decrease flow through sleeve 88, or actuating plate 89 to decrease the flow area through valve 78C.

Vibration sensor 110 is positioned on stationary structure 112. Vibration sensor 110 senses the extent to which stationary structure 112 vibrates during operation of gas turbine engine 10. Vibration sensor 110 can be an accelerometer. Vibration sensor 110 sends vibration data to electronic engine controller 102 by vibration data channel 114. If electronic engine controller 102 determines that stationary structure 112 is vibrating too much, then it can send a command to open or close variable position valve 78A, 78B, or 78C to a greater degree by contracting diaphragm 80 or positioning poppet 91 to increase or decrease flow through sleeve 88, or by actuating plate 89 to increase or decrease the flow area through variable position valve 78C.

Temperature sensor 116 is disposed near fluid compartment 66. Temperature sensor 116 measures the temperature of fluid 74 inside fluid compartment 66. As stated above, the temperature of fluid 74 is relevant to its viscosity. Temperature sensor 116 sends temperature data to electronic engine controller 102 by temperature data channel 118. Electronic engine controller 102 can calculate the viscosity of fluid 74 based on fluid type and fluid 74's temperature. If electronic engine controller 102 determines that fluid 74's viscosity is inadequate to provide damping, then it can send a command to open or close variable position valve 78A, 78B, or 78C. This way fluid 74 supply pressure can be adjusted to compensate. Temperature sensor 116 can also be disposed so as to sense a temperature of fluid 74 in first conduit 76 or second conduit 82.

Rotation sensor 120 is disposed near low pressure shaft 38. Rotation sensor 120 measures the rate of rotation of low pressure shaft 38. Low pressure shaft 38's rate of rotation can be relevant to bearing damping system 70A, 70B, 70C, or 70D in several different ways. For example, at startup of gas turbine engine 10, fluid in bearing damping system 70A, 70B, 70C, or 70D can be low. This can result from pump 72 being an engine driven pump. If pump 72 is engine driven, then fluid will not be pumped into bearing damping system 70A, 70B, 70C, or 70D when gas turbine engine 10 is shut down. If electronic engine controller 102 senses that low pressure shaft 38 has begun to rotate based on data from rotation sensor 120, then it can send a command to open variable position valve 78A, 78B, or 78C to a greater degree by contracting diaphragm 80, positioning poppet 91 to increase the flow area through sleeve 88, or retracting plate 89 to increase the flow area through valve 78C. This way flow of fluid 74 will be at its greatest magnitude during engine start up.

In another example, if low pressure shaft 38 has a known natural frequency, then electronic engine controller 102 can be programmed to actuate variable position valve 78A or 78B as described above to increase or decrease the flow of fluid 74 to dampen any vibrations associated with reaching the natural frequency of low pressure shaft 38. If bearing damping system 70A, 70B, 70C, or 70D is applied to high pressure shaft 40 these same principles can apply to it.

Figure 8:
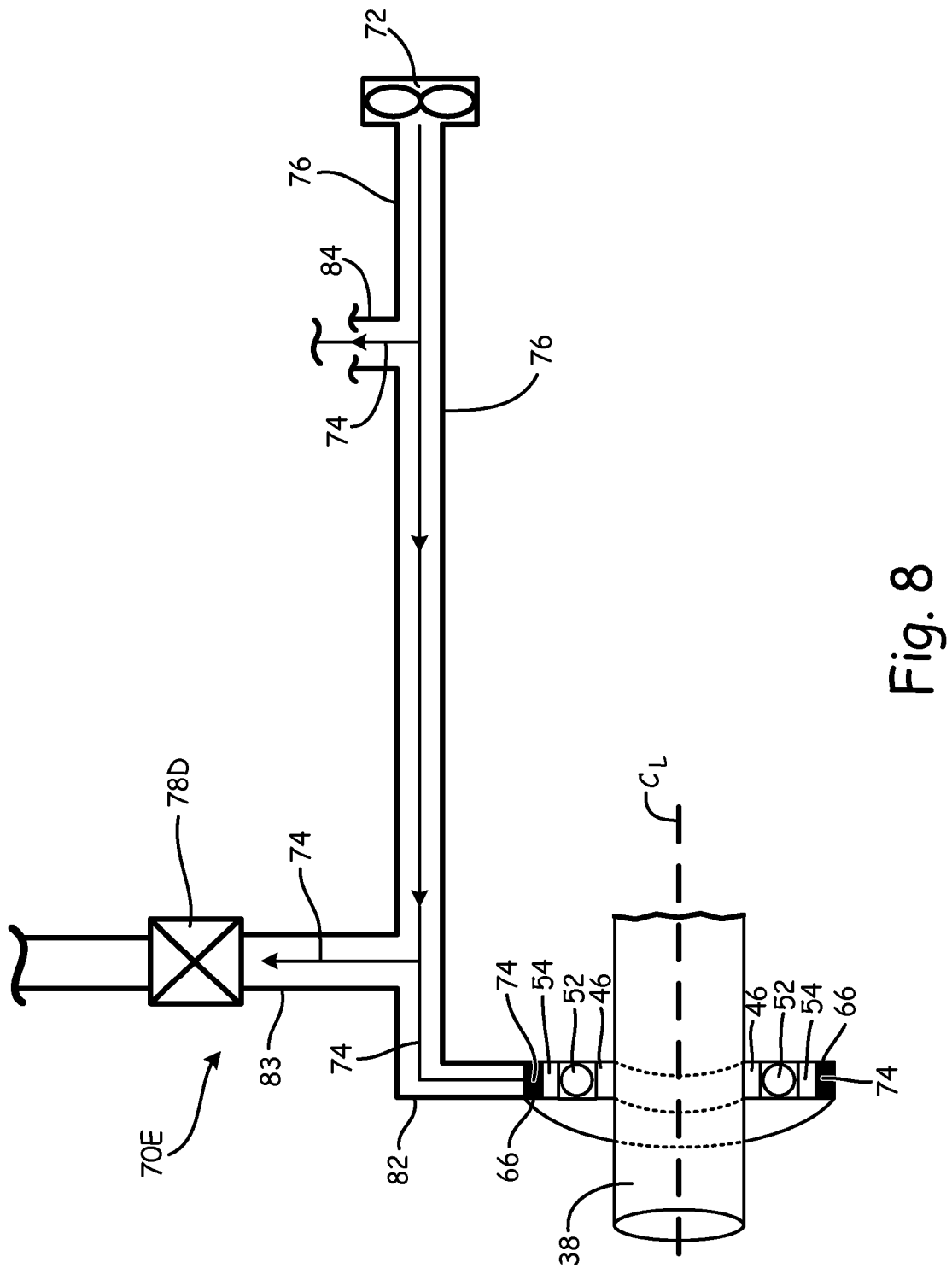
FIG. 8 is a schematic view of an alternative bearing damping system having a valve disposed on a bypass line regulating fluid flow.

FIG. 8 is a schematic view of bearing damping system 70E. Bearing damping system 70E includes many of the same components as bearing damping systems 70A, 70B, 70C, and 70D. Bearing damping system 70E, however, differs in several respects. For example, bearing damping system 70E includes variable position valve 78D and bypass line 83.

In bearing damping system 70E fluid 74 is transported from pump 72 to fluid compartment 66 by first conduit 76. Bypass line 83 branches off first conduit 76 and leads to variable position valve 78D and to other components of gas turbine engine 10.

In operation, the flow area in variable position valve 78D can be adjusted to be one of a plurality of open positions ranging from fully open to closed. When variable positon valve 78D is fully closed the flow of fluid 74 to fluid compartment 66 will be at a maximum. As variable position valve 78D opens the flow area in valve 78D increases. This results in fluid 74 flowing through bypass line 83, which reduces the flow of fluid 74 into fluid compartment 66. Variable position valve 78D can be actuated in any of the manners described above with respect to variable positon valves 78A-78C.

Figure 9:
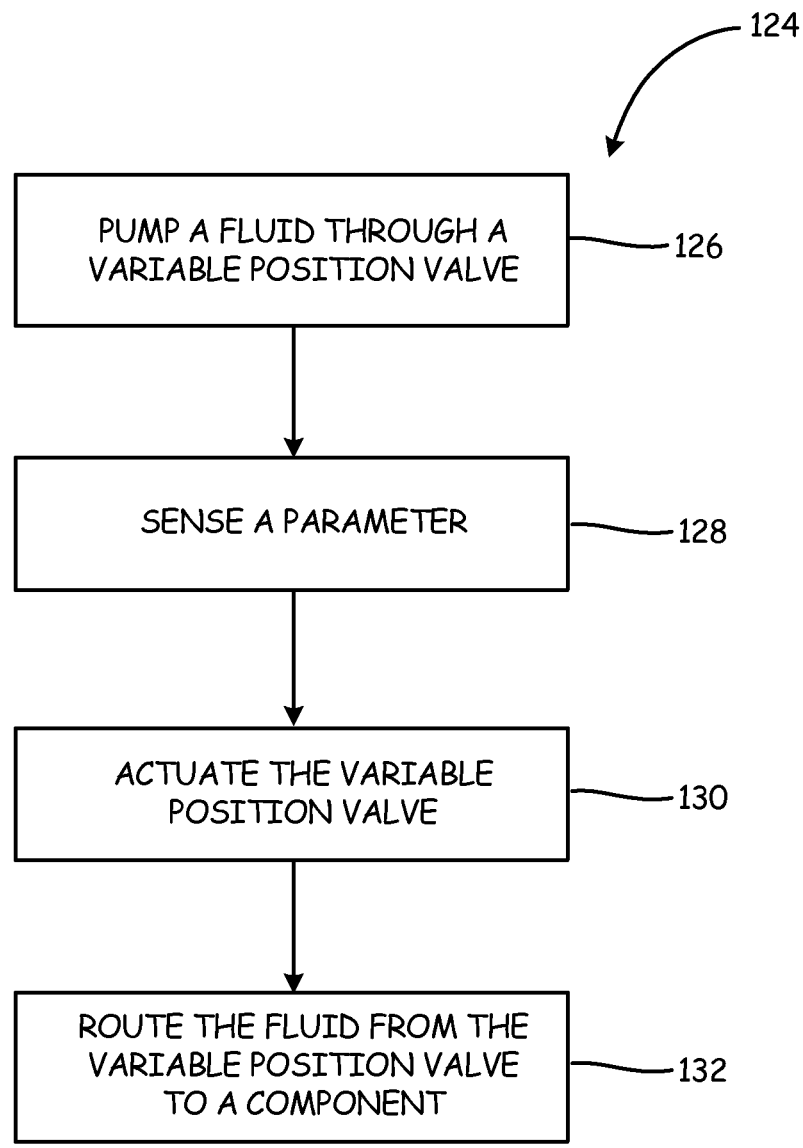
FIG. 9 is a flow diagram showing a method of adjusting a stiffness of a fluid damped bearing.

FIG. 9 is a flow diagram showing method 124 for adjusting a stiffness fluid damped bearing system 70A, 70B, 70C, 70D, or 70E. As shown, method 124 includes pumping step 126, sensing step 128, actuating step 130, and routing step 132. In pumping step 126 a fluid is pumped through first conduit 76 through variable position valve 78A, 78B, or 78C. In sensing step 128 a parameter relating to a vibration rate of low pressure shaft 38 or high pressure shaft 40 is sensed. That parameter can be any parameter discussed above. That parameter can be sensed, for example, by the pressure of fluid 74 being communicated to the back side of variable position valves 78A, 78B, or 78C as described above. The parameter can also be sensed by one of the sensors described above communicating data to electronic engine controller 102. In actuating step 130 variable position valve 78A, 78B, or 78C is actuated as described above in response to the sensed parameter. In routing step 132 fluid 74 is routed to fluid compartment 66.

There are numerous reasons to use bearing damping system 70A, 70B, 70C, 70D, or 70E including the following non-limiting reasons. First, by controlling the pressure and the flow of fluid 74, as described above, the damping effect of bearing damping system 70A, 70B, 70C, 70D, or 70E can be optimized. Bearing damping system 70A, 70B, 70C, 70D, or 70E works best when fluid 74 is at an optimum supply pressure. That is, the volume of fluid 74 inside fluid compartment 66 can be maintained so as not to be operating under the soft or stiff conditions described above by using bearing damping system 70A, 70B, 70C, 70D, or 70E. As an example fluid 74 can have pressure ranging from about 35 pounds per square inch differential (psid) to about 100 psid. That is, the volume of fluid 74 inside fluid compartment 66 can be maintained so as not to be operating under the soft or stiff conditions described above by using bearing damping system 70A, 70B, 70C, 70D, or 70E.

Because variable positon valves 78A, 78B, 78C, and 78D have multiple open positions the flow of fluid 74 into fluid compartment 66 can be fine-tuned to keep the fluid volume inside compartment 66 in the optimum range during operation of gas turbine engine 10. For example, variable position valves 78A, 78B, 78C, or 78D can be actuated to increase the flow of fluid 74 if the fluid volume inside fluid compartment 66 falls below a certain threshold value causing the above referenced soft damper condition. The increase in flow into fluid compartment 66 will increase the fluid volume inside fluid compartment 66. Additionally, variable position valves 78A, 78B, 78C, or 78D can be actuated to decrease the flow of fluid 74 if the fluid volume inside fluid compartment 66 rises above a certain threshold value causing the above referenced stiff damper condition.

Additionally, the ability of variable position valves 78A, 78B, 78C, or 78D to keep damped bearing 42 at optimal conditions can reduce the possibility of a blade rubbing event. Blade rubbing can occur if low pressure shaft 38 vibrates enough to cause the tip of one of the rotor blades to contact a stationary structure. This can damage the blade and require unscheduled maintenance on gas turbine engine 10.

Additionally, the rotor balance of gas turbine engine 10 can change over time. That is, if the LP spool or HP spool was initially balanced when it was installed into gas turbine engine 10, wear during operation can cause it to become unbalanced. The ability of bearing damping system 70A, 70B, 70C, 70D, or 70E to fine tune the pressure of fluid 74 in fluid compartment 66 however, can account for balance changes in the rotation of the spool and thus effectively dampen the vibrations.

DISCUSSION OF POSSIBLE EMBODIMENTS

The following are non-exclusive descriptions of possible embodiments of the present invention.

A bearing damping system according to an exemplary embodiment of the invention can optionally include, additionally and/or alternatively, any one or more of the following features, configurations and/or additional components: a pump configured to pump a fluid through the system; a variable position valve connected to the pump by a first conduit and having a plurality of open positions each configured to generate different flows of the fluid downstream from the variable position valve; and a bearing assembly connected to the variable position valve by a second conduit and including: a bearing housing having an outer surface and an inner surface, the bearing housing configured to be attached to a stationary structure; a stationary bearing race having an outer surface and an inner surface and positioned within the bearing housing; a rotating bearing race having an outer surface and an inner surface spaced apart from the stationary bearing race and configured to be attached to a rotating component; a bearing element disposed between the inner surface of the stationary bearing race and the outer surface of the rotating g bearing race; and a fluid compartment defined by the space between the inner surface of the bearing housing and the outer surface of the stationary race and configured to receive the fluid from the second conduit.

The bearing damping system of the preceding paragraph can optionally include, additionally and/or alternatively, any one or more of the following features, configurations and/or additional components:

A further embodiment of the foregoing bearing damping system, wherein the variable position valve comprises: a pressure regulating valve that can have an adjustable diaphragm disposed between the first conduit and the second conduit.

A further embodiment of the foregoing bearing damping system, wherein the bearing system can include a plate movably disposed within the variable position valve to generate a plurality of flow areas through the variable position valve.

A further embodiment of the foregoing bearing damping system, wherein the variable position valve can include a sleeve disposed in the first conduit in which the sleeve can include a plurality of orifices and a poppet movably disposed within the sleeve and configured to regulate a flow area though the sleeve by blocking at least one orifice.

A further embodiment of the foregoing bearing damping system, wherein the variable position valve can be configured to restrict a flow of the fluid into the fluid compartment when a fluid supply pressure into the compartment exceeds a threshold pressure.

A further embodiment of the foregoing bearing damping system, wherein the variable position valve can be configured to increase a flow of the fluid when the fluid supply pressure into the fluid compartment falls below a threshold pressure.

A further embodiment of the foregoing bearing damping system, wherein the system can further include a controller configured to monitor a parameter and actuate the variable position valve to maintain an optimum fluid pressure in the fluid compartment, wherein the parameter monitored by the controller is selected from the group consisting of: a stationary structure vibration rate, a component rotation rate, a fluid pressure in the first conduit, a fluid pressure in the second conduit, a fluid pressure in the fluid compartment, a fluid viscosity in the first conduit, a fluid viscosity in the second conduit, a fluid viscosity in the fluid compartment, a fluid temperature in the fluid compartment, a fluid temperature in the first conduit, a fluid temperature in the second conduit, and combinations thereof.

A further embodiment of the foregoing bearing damping system, wherein the system can further include an accelerometer disposed on the stationary structure configured to measure the stationary structure vibration rate.

A gas turbine engine according to an exemplary embodiment of the invention can optionally include, additionally and/or alternatively, any one or more of the following features, configurations and/or additional components: a stationary section; a rotating section joined to a shaft; a bearing housing having a radially outer surface and a radially inner surface and attached to the stationary section of the gas turbine engine; a stationary bearing race having a radially outer surface and a radially inner surface and spaced radially inward from the bearing housing; a rotating bearing race having a radially outer surface and a radially inner surface and spaced radially inward from the stationary bearing race and attached to the shaft; a bearing element disposed between the radially inner surface of the stationary bearing race and the radially outer surface of the rotating bearing race; a fluid compartment defined by the space between the radially inner surface of the bearing housing and the radially outer surface of the stationary race; a pump configured to pump a fluid into the fluid compartment; and a variable position valve having a plurality of open positions configured to generate a plurality of fluid flows within the fluid compartment.

The gas turbine engine of the preceding paragraph can optionally include, additionally and/or alternatively, any one or more of the following features, configurations and/or additional components:

A further embodiment of the foregoing gas turbine engine, wherein the variable position valve can be positioned between the pump and the fluid chamber.

A further embodiment of the foregoing gas turbine engine, wherein the variable position valve can regulate a flow of the fluid by increasing or decreasing a size of a valve flow area A further embodiment of the foregoing gas turbine engine, wherein the variable position can increase the size of the valve flow area when the fluid supply pressure into the fluid compartment falls below a threshold pressure.

A further embodiment of the foregoing gas turbine engine, wherein the variable position valve can decrease the size of the valve flow area when the fluid supply pressure into the fluid compartment exceeds a threshold pressure.

A further embodiment of the foregoing gas turbine engine, wherein the gas turbine engine can further include a controller that actuates the variable position valve based on a parameter selected from the group consisting of: a stationary structure vibration rate, a shaft rotation rate, a fluid pressure between the pump and the variable position valve, a fluid pressure between the variable position pump and the fluid compartment, a fluid pressure in the fluid compartment, a fluid viscosity, a fluid temperature, and combinations thereof.

A further embodiment of the foregoing gas turbine engine, wherein the stationary structure vibration rate can be measured by an accelerometer.

A further embodiment of the foregoing gas turbine engine, wherein the bearing element can be a ball or a roller.

A method of adjusting a stiffness of a fluid damped bearing according to an exemplary embodiment of the invention can optionally include, additionally and/or alternatively, any one or more of the following steps: pumping a fluid through a variable position valve having a plurality of open positions; sensing a parameter relating to a vibration rate of a rotating component; actuating a variable position valve in response to the sensed parameter to control a flow of a fluid; and routing the fluid from the variable positon valve to a fluid compartment formed between a bearing housing and a stationary race of the fluid damped bearing.

The method of the preceding paragraph can optionally include, additionally and/or alternatively, any one or more of the following steps or features:

A further embodiment of the foregoing method, wherein the parameter can be selected from the group consisting of: a stationary structure vibration rate, a component rate of rotation, a fluid viscosity, a fluid temperature, a fluid pressure, and combinations thereof.

A further embodiment of the foregoing method, wherein the method can include the step of restricting a flow of the fluid into the fluid damped bearing when the pressure inside the compartment exceeds a threshold pressure.

A further embodiment of the foregoing method, wherein the method can include the step of increasing the flow of the fluid when the pressure falls below a threshold feed pressure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bearing damping system comprising:
   a pump configured to pump a fluid through the system;
   a variable position valve connected to the pump by a first conduit and having a plurality of open positions each configured to generate a different flow of the fluid downstream from the variable position valve; and
   a bearing assembly connected to the variable position valve by a second conduit and comprising:
      a bearing housing having an outer surface and an inner surface, the bearing housing configured to be attached to a stationary structure;
      a stationary bearing race having an outer surface and an inner surface and positioned within the bearing housing;
      a rotating bearing race having an outer surface and an inner surface spaced apart from the stationary bearing race and configured to be attached to a rotating component;
      a bearing element disposed between the inner surface of the stationary bearing race and the outer surface of the rotating bearing race; and
      a fluid compartment defined by the space between the inner surface of the bearing housing and the outer surface of the stationary race and configured to receive the fluid from the second conduit.

2. The bearing damping system of claim 1, wherein the variable position valve comprises:
   a pressure regulating valve having an adjustable diaphragm disposed between the first conduit and the second conduit.

3. The bearing damping system of claim 1, wherein the variable position valve comprises:
   a plate movably disposed within the variable position valve to generate a plurality of flow areas through the variable position valve.

4. The bearing damping system of claim 1, wherein the variable position valve comprises:
   a sleeve disposed in the first conduit wherein the sleeve has a plurality of orifices; and
   a poppet movably disposed within the sleeve and configured to decrease a flow area though the sleeve by blocking at least one orifice.

5. The bearing damping system of claim 1, wherein the variable position valve is configured to restrict a flow of the fluid into the fluid compartment when a fluid pressure into the compartment exceeds a threshold pressure.

6. The bearing damping system of claim 1, wherein the variable position valve is configured to increase a flow of the fluid into the fluid compartment when the fluid pressure into the compartment falls below a threshold pressure.

7. The bearing damping system of claim 1, and further comprising:
   a controller configured to monitor a parameter and actuate the variable position valve to maintain an optimum fluid pressure into the fluid compartment, wherein the parameter monitored by the controller is selected from the group consisting of: a stationary structure vibration rate, a component rotation rate, a fluid pressure in the first conduit, a fluid pressure in the second conduit, a fluid pressure in the fluid compartment, a fluid viscosity in the first conduit, a fluid viscosity in the second conduit, a fluid viscosity in the fluid compartment, a fluid temperature in the fluid compartment, a fluid temperature in the first conduit, a fluid temperature in the second conduit, and combinations thereof.

8. The bearing damping system of claim 1, and further comprising:
an accelerometer disposed on the stationary structure configured to measure the stationary structure vibration rate.

9. A gas turbine engine comprising:
a stationary section;
a rotating section joined to a shaft;
a bearing housing having a radially outer surface and a radially inner surface and attached to the stationary section of the gas turbine engine;
a stationary bearing race having a radially outer surface and a radially inner surface and spaced radially inward from the bearing housing;
a rotating bearing race having a radially outer surface and a radially inner surface and spaced radially inward from the stationary bearing race and attached to the shaft;
a bearing element disposed between the radially inner surface of the stationary bearing race and the radially outer surface of the rotating bearing race;
a fluid compartment defined by the space between the radially inner surface of the bearing housing and the radially outer surface of the stationary race;
a pump configured to pump a fluid into the fluid compartment; and
a variable position valve having a plurality of open positions configured to generate a plurality of fluid flows into the fluid compartment.

10. The gas turbine engine of claim 9, wherein the variable position valve is disposed between the fluid compartment and the pump.

11. The gas turbine engine of claim 10, and further comprising:
a controller that actuates the variable position valve based on a parameter selected from the group consisting of: a stationary structure vibration rate, a shaft rotation rate, a fluid pressure between the pump and the variable position valve, a fluid pressure between the variable position pump and the fluid compartment, a fluid pressure in the fluid compartment, a fluid viscosity, a fluid temperature, and combinations thereof.

12. The gas turbine engine of claim 11, wherein the stationary structure vibration rate is measured by an accelerometer.

13. The gas turbine engine of claim 10, wherein the bearing element is a ball or a roller.

14. The gas turbine engine of claim 9, wherein the variable position valve regulates a flow of the fluid by increasing or decreasing a size of a valve flow area.

15. The gas turbine engine of claim 14, wherein the variable position is configured to increase the size of the valve flow area when a fluid pressure into the fluid compartment falls below a threshold pressure.

16. The gas turbine engine of claim 14, wherein the variable position valve is configured to decrease the size of the valve flow area when a fluid pressure into the fluid compartment exceeds a threshold pressure.

17. A method of adjusting a stiffness of a fluid damped bearing, the method comprising:
pumping a fluid through a variable position valve having a plurality of open positions;
sensing a parameter relating to a vibration rate of a rotating component;
actuating a variable positon valve in response to the sensed parameter to control a flow of a fluid; and
routing the fluid from the variable position valve to a fluid compartment formed between a bearing housing and a stationary race of the fluid damped bearing.

18. The method of claim 17, wherein the parameter is selected from the group consisting of: a stationary structure vibration rate, a component rate of rotation, a fluid viscosity, a fluid temperature, a fluid pressure, and combinations thereof.

19. The method of claim 17, and further comprising the step of: reducing a flow of the fluid into the fluid damped bearing when a fluid pressure into the compartment exceeds a threshold pressure.

20. The method of claim 17, and further comprising the step of: increasing the flow of the fluid when a fluid pressure into the compartment falls below a threshold pressure.

* * * * *

UNITED STATES PATENT AND TRADEMARK OFFICE
CERTIFICATE OF CORRECTION

| | |
|---|---|
| PATENT NO. | : 9,494,048 B1 |
| APPLICATION NO. | : 14/709866 |
| DATED | : November 15, 2016 |
| INVENTOR(S) | : Francis Parnin |

It is certified that error appears in the above-identified patent and that said Letters Patent is hereby corrected as shown below:

In the Claims

Column 16, Line 24:
Delete "positon"
Insert --position--

Signed and Sealed this
Tenth Day of January, 2017

Michelle K. Lee
*Director of the United States Patent and Trademark Office*